United States Patent
Klinger et al.

(10) Patent No.: US 10,275,619 B2
(45) Date of Patent: Apr. 30, 2019

(54) LUGGAGE MANAGEMENT SYSTEM

(71) Applicant: International Business Machines Corporation, Armonk, NY (US)

(72) Inventors: Doina L. Klinger, Winchester (GB); Rebecca Quaggin-Mitchell, Botley (GB); Fenglian Xu, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/470,005

(22) Filed: Mar. 27, 2017

(65) Prior Publication Data

US 2018/0276430 A1    Sep. 27, 2018

(51) Int. Cl.
  *G06K 7/10*      (2006.01)
  *G06K 19/077*   (2006.01)
  *G06K 19/06*    (2006.01)

(52) U.S. Cl.
  CPC ... *G06K 7/10366* (2013.01); *G06K 19/06028* (2013.01); *G06K 19/07758* (2013.01)

(58) Field of Classification Search
  CPC .............. G06Q 10/08; G06Q 10/087; G06K 19/06028; G06K 19/07758; G06K 7/10366
  See application file for complete search history.

(56) References Cited

U.S. PATENT DOCUMENTS

| | | | |
|---|---|---|---|
| 5,051,565 A | 9/1991 | Wolfram | |
| 5,866,888 A | 2/1999 | Bravman et al. | |
| 6,044,353 A * | 3/2000 | Pugliese, III | G06Q 10/02 235/375 |
| 6,158,658 A | 12/2000 | Barclay | |
| 6,594,547 B2 | 7/2003 | Manabe et al. | |
| 9,398,795 B2 | 7/2016 | Gupta et al. | |
| 2002/0040928 A1* | 4/2002 | Jalili | G06Q 10/08 235/385 |
| 2007/0008138 A1 | 1/2007 | Mosher, Jr. et al. | |
| 2010/0259385 A1* | 10/2010 | Alston | G06Q 10/087 340/568.1 |
| 2011/0178999 A1* | 7/2011 | Banatre | G08B 13/14 707/701 |
| 2013/0168443 A1 | 7/2013 | Lin | |
| 2014/0277935 A1* | 9/2014 | Daman | G08G 1/127 701/36 |

FOREIGN PATENT DOCUMENTS

WO    2014205425 A1    12/2014

OTHER PUBLICATIONS

Unknown, "Trace Me Luggage Tracker", https://www.tmlt.co.uk/, 2015, 2 pgs.

* cited by examiner

*Primary Examiner* — Laura A Gudorf
(74) *Attorney, Agent, or Firm* — William H. Hartwell; Maxine L. Barasch; Keohane & D'Alessandro PLLC

(57) ABSTRACT

Disclosed embodiments provide techniques for managing luggage within a premises such as an airport. A group identifier is established that includes multiple travelers. Each traveler in the group has one or more pieces of luggage that are being checked at a destination airport for a flight. When the travelers arrive, the luggage is reclaimed at the baggage claim area of the arrival airport. The group identifier is associated with each piece of luggage belonging to the group. Thus, any member of the group can properly remove luggage belonging to the group from the baggage area, thereby simplifying the airport exit procedure.

18 Claims, 15 Drawing Sheets

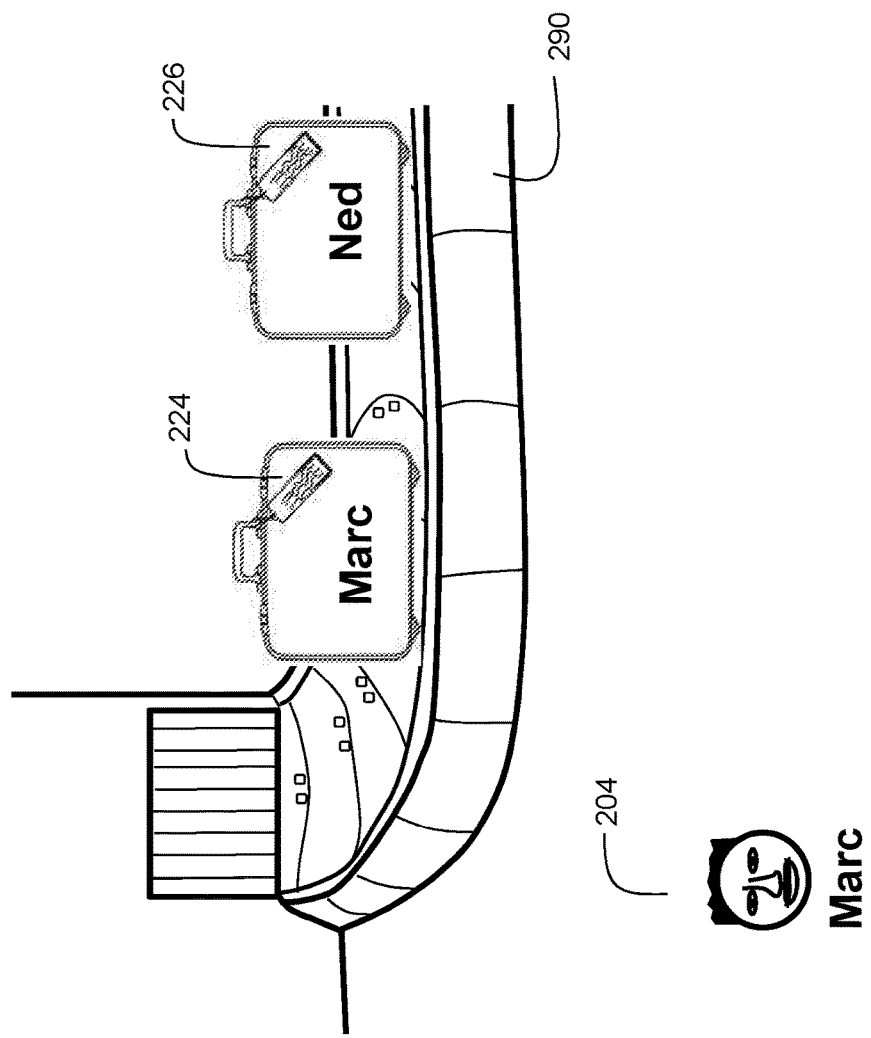

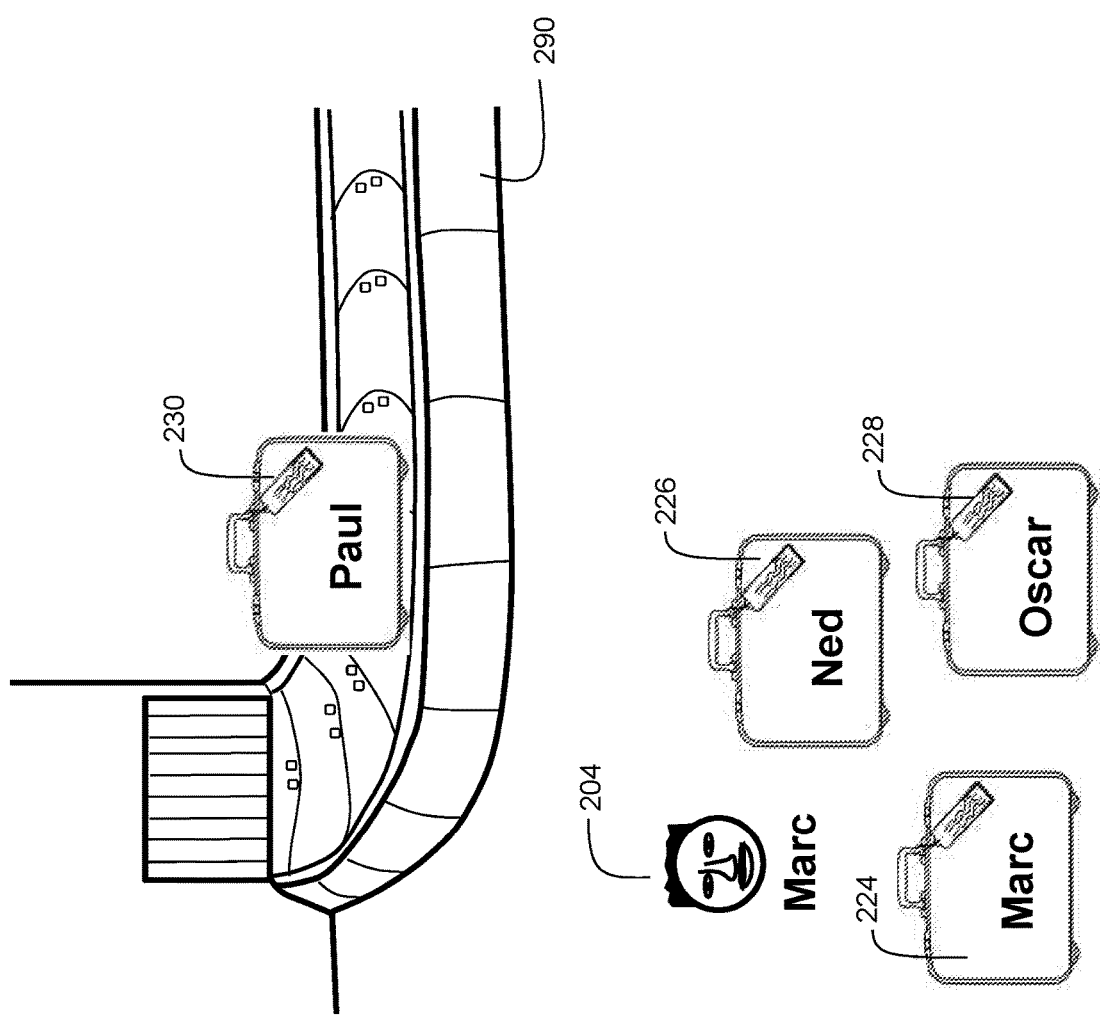

LUGGAGE MANAGEMENT SYSTEM

FIELD OF THE INVENTION

Embodiments of the invention relate generally to luggage management systems.

BACKGROUND

Millions of people travel through public transportation systems each year, such as via airlines, railroads, bus systems, and subway systems, etc. When traveling, people usually bring items of luggage. Some of this luggage is intended to be carried with the person, such as a "carry-on" item on a flight. Other items of luggage are intended for handling by the service, such as checking bags for a flight.

Much of the time, an item of luggage of one person may look very similar to an item of luggage of another person. To attempt to remedy this, some people tie a small ribbon or other object to their suitcase handle. This helps them to identify their own luggage and differentiate it from others (e.g., on an airport conveyor).

Many airports do not have an attendant to check that the bag a person takes with them from the conveyor is in fact theirs, and not someone else's. Since there is then no record of who took the bag (luggage), there leaves no recourse to the rightful owner. Accordingly, there exists a need for improvements in luggage management systems.

SUMMARY

In one aspect, there is provided a computer-implemented method for tracking luggage within a premises, comprising: establishing a group identifier pertaining to a group comprising a plurality of people; associating a plurality of luggage pieces with the group identifier; determining a group identifier of a person that is removing one of the plurality of luggage pieces from a luggage area; and providing an indication of permission on a mobile device associated with the person to exit the luggage area while carrying one or more of the plurality of luggage pieces that are associated with the group identifier.

In another aspect, there is provided an electronic device comprising: a processor; a memory coupled to the processor, the memory containing instructions, that when executed by the processor, perform the steps of: establishing a group identifier pertaining to a group comprising a plurality of people; associating a plurality of luggage pieces with the group identifier; determining an identity a group identifier of a person that is removing one of the plurality of luggage pieces from a luggage area; and providing an indication of permission on a mobile device associated with the person permitting a person from the group to exit the luggage area while carrying one or more of the plurality of luggage pieces that are associated with the group identifier.

In yet another aspect, there is provided a computer program product for creating a linked index for tracking luggage within a premises on an electronic computing device, the electronic computing device comprising a computer readable storage medium having program instructions embodied therewith, the program instructions executable by a processor to cause the electronic computing device to: establish a group identifier pertaining to a group comprising a plurality of people; associate a plurality of luggage pieces with the group identifier; determine a group identifier of a person that is removing one of the plurality of luggage pieces from a luggage area; and provide an indication of permission on a mobile device associated with the person from the group to exit the luggage area while carrying one or more of the plurality of luggage pieces that are associated with the group identifier.

BRIEF DESCRIPTION OF THE DRAWINGS

Features of the disclosed embodiments will be more readily understood from the following detailed description of the various aspects of the invention taken in conjunction with the accompanying drawings.

FIGS. 8A-8C show example baggage claim scenarios.

Figure 1:
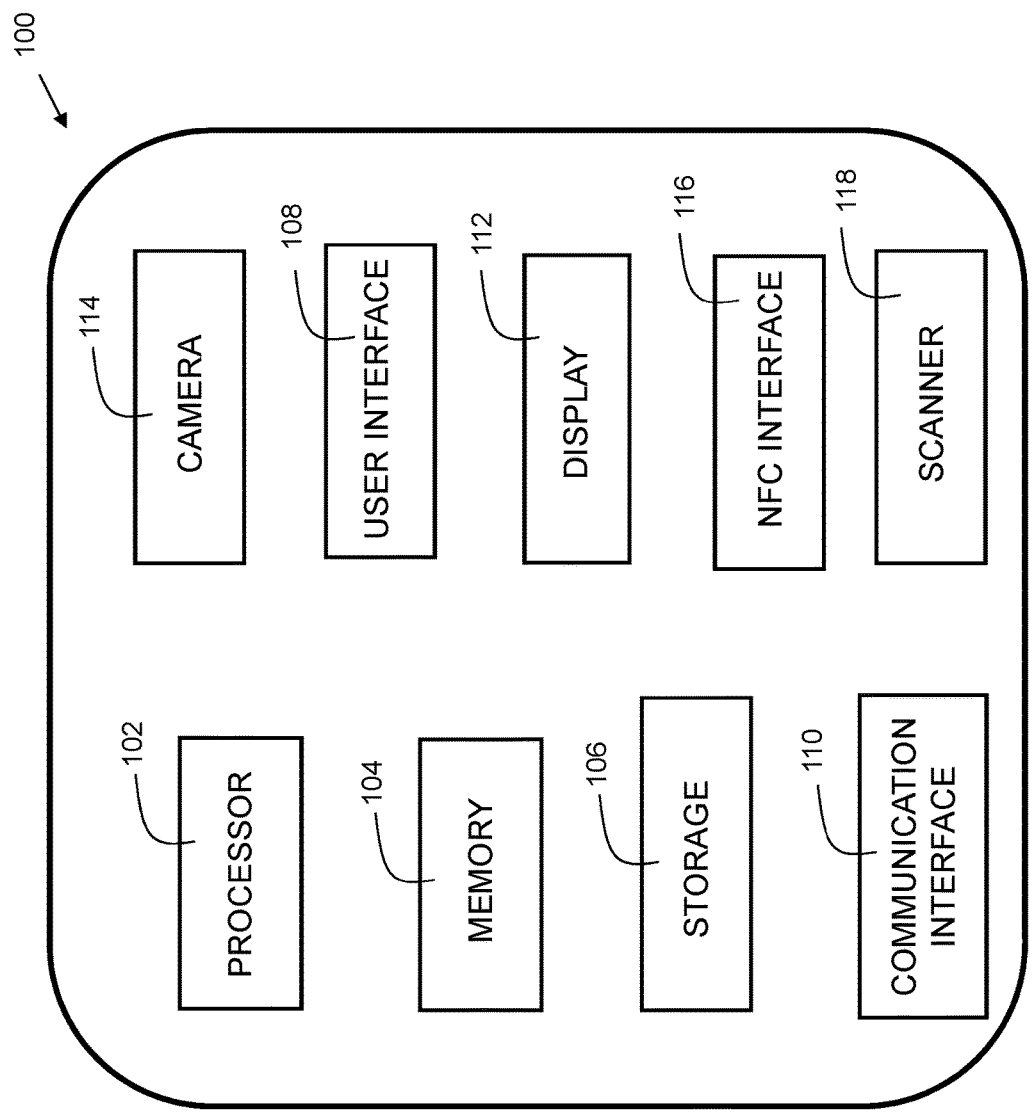
FIG. 1 is a block diagram of a device in accordance with embodiments of the present invention.

The drawings are not necessarily to scale. The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the figures may be omitted, or illustrated not-to-scale, for illustrative clarity.

DETAILED DESCRIPTION

Disclosed embodiments provide techniques for managing luggage within a premises such as an airport. A group identifier is established that includes multiple travelers. Travelers in the group can have one or more pieces of luggage that are being checked at a destination airport for a flight. When the travelers arrive, the luggage is reclaimed at the baggage claim area of the arrival airport. The group identifier is associated with each piece of luggage belonging to the group. In many cases, especially when families are traveling together, each ticketed passenger may have a bag allowance. Thus, in some cases, children traveling with the family may have used their baggage allowance to check a piece of luggage. Upon exit from the baggage reclaim area of the arrival airport, it can provide increased convenience if any member of the group is authorized to remove all bags belonging to the group from the baggage reclaim area. Thus, instead of having to produce individual claim checks for each ticketed passenger, one person within the group can take custody of all the luggage belonging to the group. This allows for improved efficiency in the baggage reclaim area of an airport or other transportation terminal.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, integers, steps, operations, elements, components, and/or groups thereof.

FIG. 1 is a block diagram of a device in accordance with embodiments of the present invention. Device 100 is shown as a simplified diagram of modules. Device 100 is an electronic computing device. Device 100 includes a processor 102, which is coupled to a memory 104. Memory 104 may include dynamic random access memory (DRAM), static random access memory (SRAM), magnetic storage, and/or a read only memory such as flash, EEPROM, optical storage, or other suitable memory. In some embodiments, the memory 104 may not be a transitory signal per se. Memory 104 includes instructions, which when executed by the processor, implement steps of embodiments of the present invention.

Device 100 may further include storage 106. In embodiments, storage 106 may include one or more magnetic storage devices such as hard disk drives (HDDs). Storage 106 may include one or more solid state drives (SSDs). Any other storage device may be included instead of, or in addition to, those disclosed herein.

Device 100 may further include a display 112, examples of which include a liquid crystal display (LCD), a plasma display, a cathode ray tube (CRT) display, a light emitting diode (LED) display, an organic LED (OLED) display, or other suitable display technology. The display may include a touch screen incorporating a capacitive or resistive touch screen in some embodiments. The device 100 may further include user interface 108 such as a keyboard, mouse, and/or buttons, etc.

The device 100 may further include a communication interface 110. In some embodiments, the communication interface 110 may include a wireless communication interface that includes modulators, demodulators, and antennas for a variety of wireless protocols including, but not limited to, Wi-Fi, and/or cellular communication protocols for communication over a computer network.

The device 100 may further include a near-field communication (NFC) interface 116. In some embodiments, the NFC interface 116 may include a wireless communication interface that includes modulators, demodulators, and antennas for a variety of wireless protocols including, but not limited to, Bluetooth™, Zigbee™, air interface protocol ISO 18000, and/or other suitable communication protocols.

The device 100 may further include a camera 114. Camera 114 may be a photographic camera, infrared (IR), or other suitable environment detection device. The camera may include a flash for supplying light.

The device 100 may further include a scanner 118. In embodiments, the scanner may be a radio frequency ID reader. An RFID (Radio Frequency identification) reader assigns data to, and reads the data from, RFID tags. In embodiments, device 100 may be implemented as a smartphone or other mobile computing device. Device 100 may operate as a client in embodiments of the present invention to perform portions of various embodiments.

Figure 2:
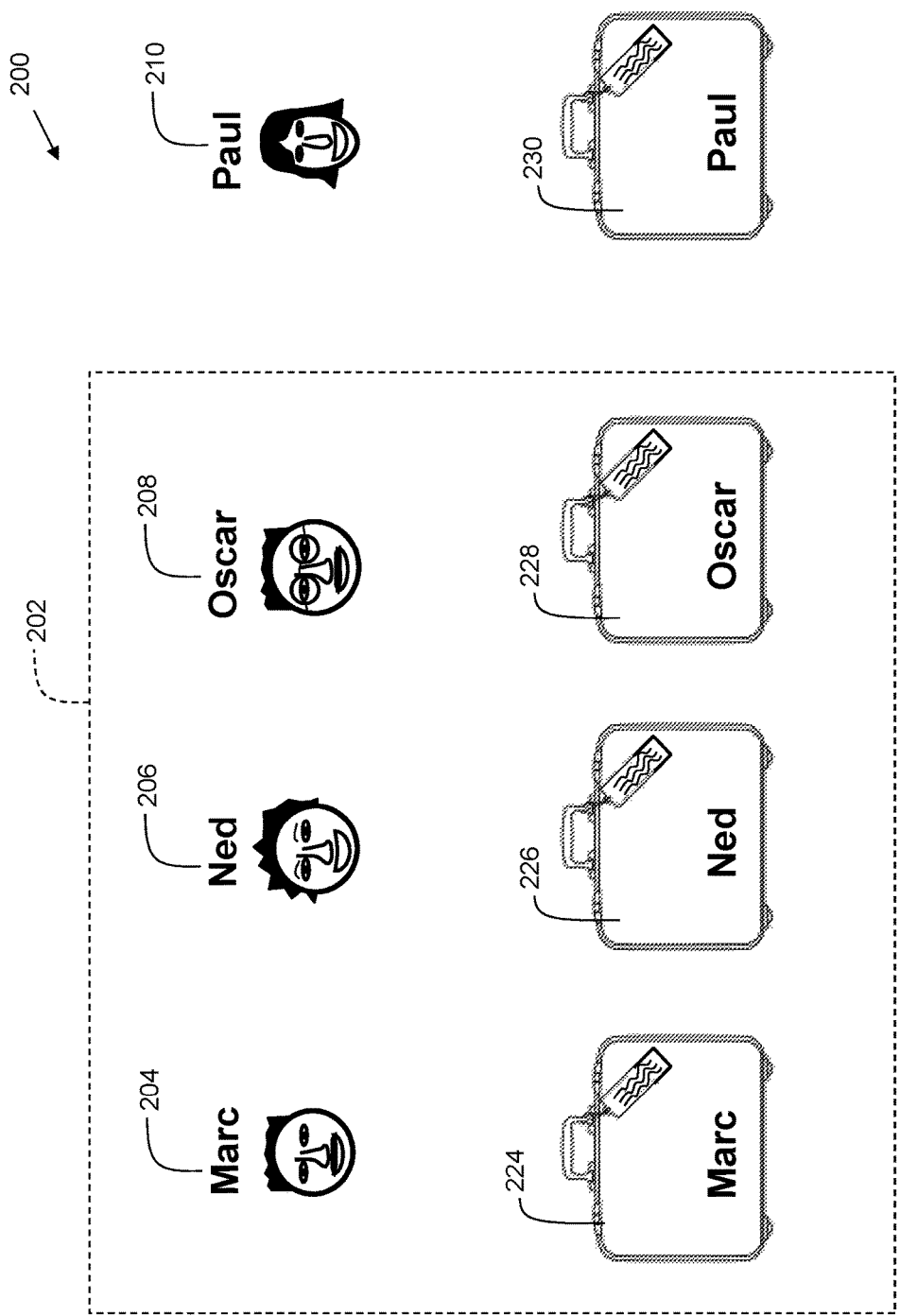
FIG. 2 shows an example of a group in accordance with embodiments of the present invention.

FIG. 2 shows an example 200 of a group of people in accordance with embodiments of the present invention. In the example discussed herein, embodiments of the invention are described with respect to a scenario in an airport. It should be recognized that this scenario is an example, and any suitable venue may be used (e.g., a railroad station, bus station, etc.). In the example, Marc 204, Ned 206, and Oscar 208 are in an airport and traveling together as a group represented at 202. Paul 210 is another person at the airport who is not a member of group 202. Marc 204 is traveling with luggage 224. Ned 206 is traveling with luggage 226. Oscar 208 is traveling with luggage 228. Paul 210 is traveling with luggage 230. Each person arrives at the airport for a flight departure with his/her respective luggage. It should be recognized that luggage may be any type of suitable device, such as a suitcase, bag, backpack, purse, computer case, roller bag, etc.

Figure 3:
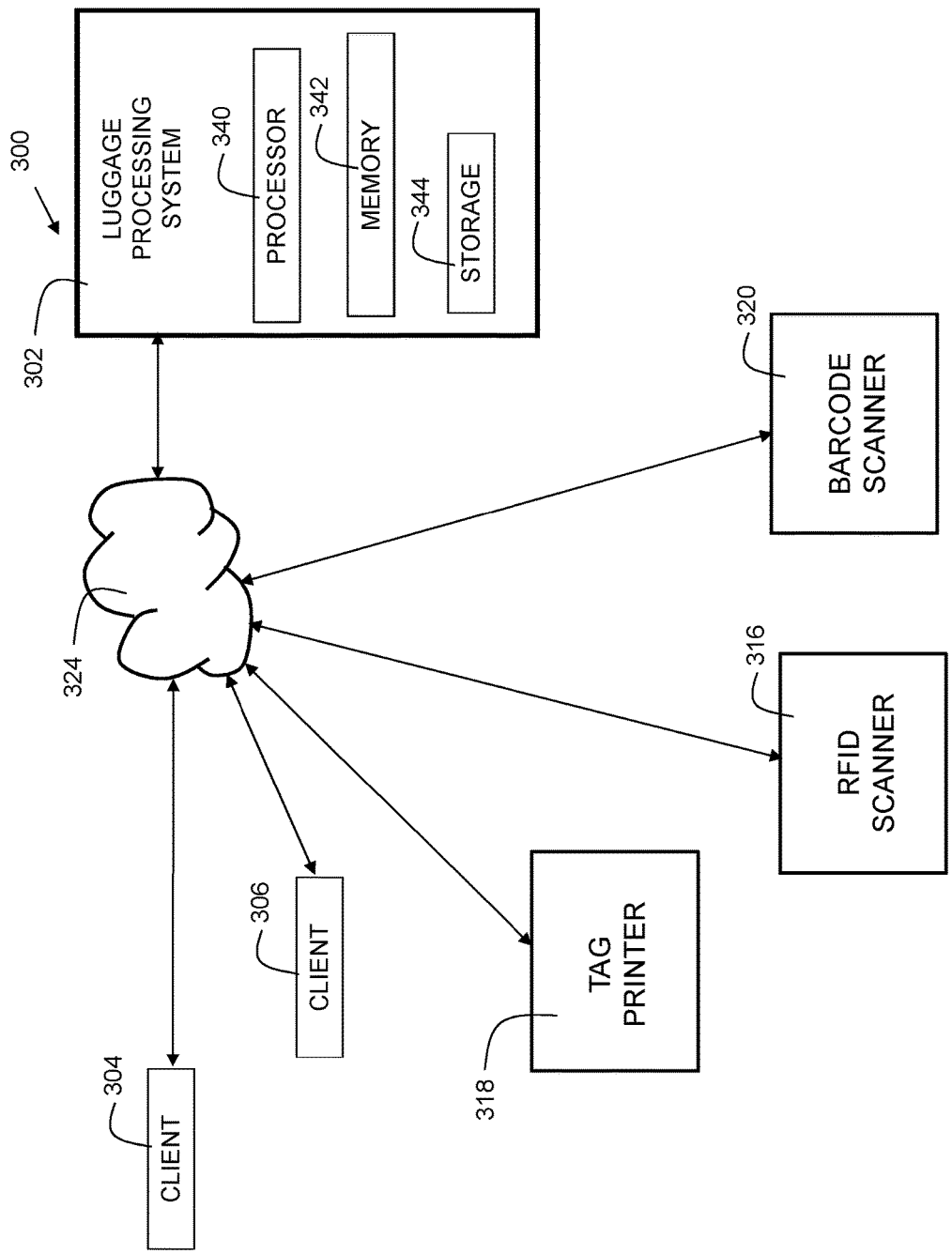
FIG. 3 is a diagram illustrating an environment for implementing embodiments of the present invention.

FIG. 3 is a diagram 300 illustrating an environment for implementing embodiments of the present invention. A luggage processing system 302 includes a processor 340, memory 342, and storage 344. The luggage processing system 302 may serve as a backend component which stores and processes information that may be accessed by client devices such as device 100 of FIG. 1. System 302 includes instructions stored in memory 342 for processor to execute elements of embodiments of the present invention. System 302 is in communication with tag printer 318, radio frequency ID scanner 316, barcode scanner 320, and client devices 304 and 306 through network 324. In embodiments, network 324 may be the Internet, a wide area network (WAN), a local area network (LAN), a cloud computing network, or other suitable network. Client devices may be any suitable electronic devices. Examples include smartphones, tablet computers, smart watches, laptop computers, desktop computers, etc. In implementations, more, fewer, or different elements may be included in the environment.

Tag printer 318 prints a tag (onto, e.g. paper or plastic, etc.) which gets attached to a person's luggage. Typically, such a tag is taped, or attached with a string to a user's luggage post-printing. The tag usually includes an identifier, such as an RFID tag, barcode, QR code, or other similar code/tag. The tag may contain written information as well, such as the user's name, flight number, etc.

RFID scanner 316 is a device that assigns data to, and reads the data from, radio frequency tags. An RFID tag includes associated information, and an RFID scanner collects information from the tag via radio waves. In embodiments of the present invention, an RFID tag for an item of luggage may include information such as the user's name, airline, and/or flight number.

In some embodiments, a barcode scanner may be included instead of, or in addition to, the RFID scanner. Barcode scanner 320 is a device that reads barcodes. A barcode is a machine-readable code in the form of numbers and a pattern of lines of varying widths, which codes associated information. In embodiments of the present invention, a barcode for a bag may include information such as the user's name, airline, and/or flight number. In some embodiments, the barcode scanner may be a camera associated with a computer or a mobile device.

In implementations, more or fewer scanners may be included in the environment, as well as different types, such as, for example, a quick response code scanner. Printer 318 is programmed to print tags/codes applicable to whichever type of scanner is to be used. The scanner may be on a user device (e.g., a camera of a smartphone), or be located at an airline check-in point or security checkpoint of a baggage claim operated by airport or airline personnel.

Figure 4:
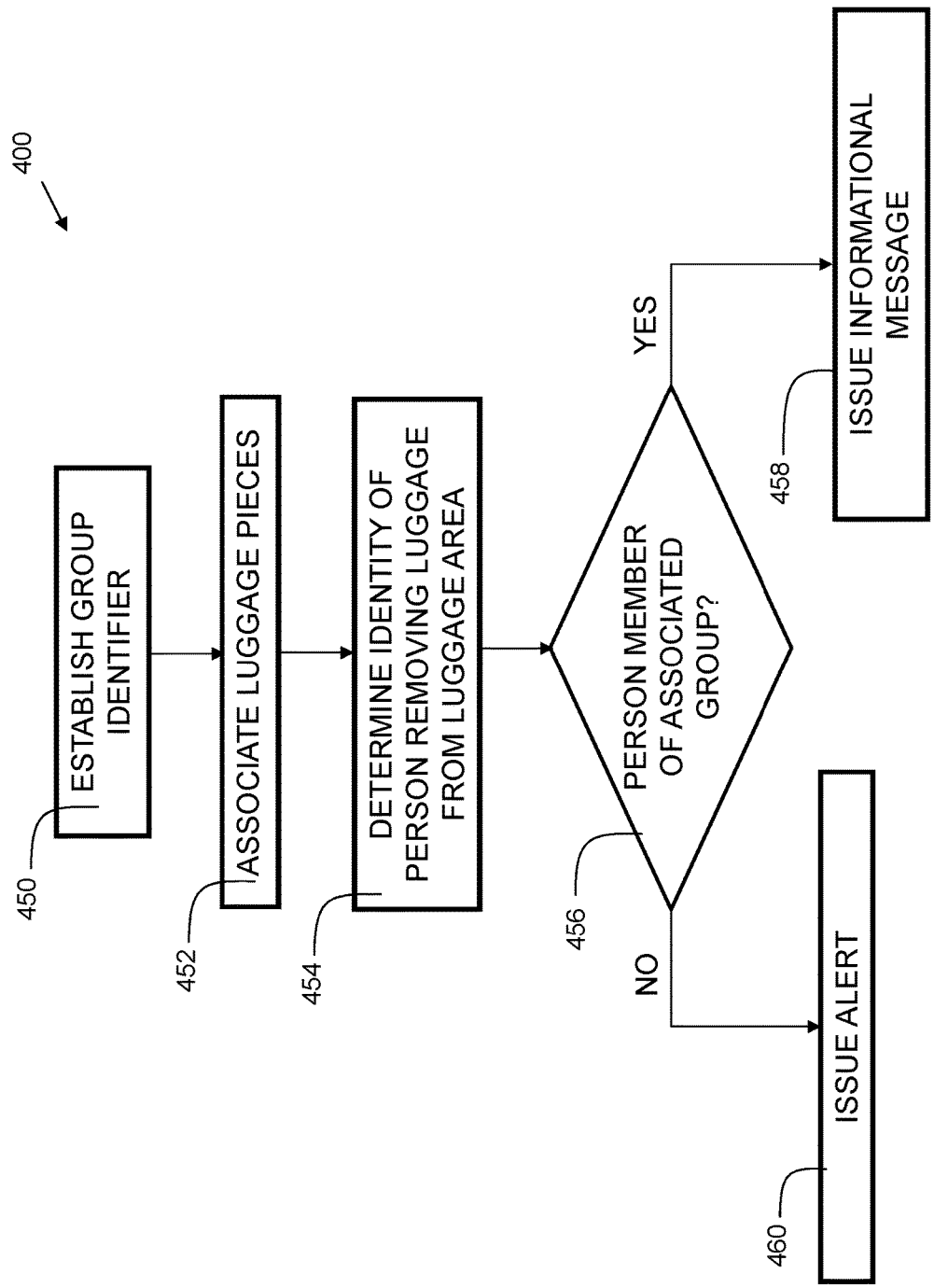
FIG. 4 is a flowchart indicating process steps for embodiments of the present invention.

FIG. 4 is a flowchart 400 indicating process steps for embodiments of the present invention. In embodiments, the process steps shown in flowchart 400 may be executed by luggage processing system 302 and/or client 100. At 450, a group identifier is established. In some embodiments, establishing the group identifier is based on a ticket purchase transaction, a data exchange (See FIG. 11), or other suitable method. In some embodiments, a group identifier is selected by an airline attendant's computer, or a server running in the backend of an app., etc. In some embodiments, the group identifier is randomly selected. In others, it is chosen from a list. In yet others, it is custom made by a user or the airline.

At 452, luggage items are associated with the group identifier. For example, if Marc 204 purchases tickets in a single transaction for himself, Ned 206, and Oscar 208, their luggage 224, 226, and 228 would together be associated with a (same) group identifier. In some embodiments, a barcode is applied via a bag tag (see, e.g., FIG. 6) to each of the plurality of luggage pieces, wherein the barcode is encoded with the group identifier. In some embodiments, an RFID tag is applied to each of the plurality of luggage pieces via a bag tag (see, e.g., FIG. 6), wherein the RFID tag is encoded with the group identifier.

At 454, an identity of the person removing the luggage from the luggage area is determined. This can be determined by checking a boarding pass or other form of identification (by venue security agents or other personnel). In some embodiments, a mobile device of the user may render an identification pattern on a display of the mobile device. The identification pattern can include alphanumeric text, a barcode, a quick response (QR) code, and/or other identifying information indicating the identity of the passenger as well as the group identifier. In some embodiments, the identity of the person removing the luggage from the luggage area may be determined by transmitting the information wirelessly via a near-field communication interface on the mobile device. The information may be read by a scanner within the airport premises near the exit of the luggage area.

At 456, it is determined whether the identified person is a member of the group associated with the group identifier. The person's identity is compared to a database of Group IDs and associated identities (see FIG. 7). If yes, at 458, an informational message is issued. The informational message can indicate to a user that the identified person has picked up a piece of luggage belonging to the group, and is allowed to exit the baggage area. Alternatively, if someone else in the group picked up the correct bag, then the informational message may indicate that someone else within the group picked up the user's luggage. If a "no" is determined at 456, then at 460, an alert is issued. The alert may be issued in the form of an SMS message, an email, an intra-application message, an instant message, or any other suitable message form. In embodiments, the alert may be sent to one or more of the following: a user device (e.g., a phone number or email address) of a person associated with the item of luggage; a user device of the person wrongfully taking the luggage; or to a device used by the venue's security team; or to a device used by the police.

In some embodiments, most of the process occurs on the luggage processing system 302. For example, the user's mobile device can simply report locations and associated luggage to the luggage processing system 302, which then performs computations to determine if the correct luggage is associated with the user. The luggage processing system then sends messages to a client device (such as the user's smartphone) and the messages are rendered on the user's device. In other embodiments, the user's device may perform some of the processing in order to reduce the amount of network traffic required, and reduce the computational burden of the luggage processing system. For example, the client device (e.g. device 100 of FIG. 1) can in some embodiments store the group identifier locally. Thus, when luggage is associated with the user (e.g. by RFID or barcode) the user's mobile device determines if the group ID of the luggage matches the group ID of the user. If the luggage processing system provides the client device with this information in advance of the baggage reclamation, then the group ID verification performed at the baggage claim can be done in an "offline" mode without the immediate involvement of the luggage processing system. This can be advantageous since in some airports, the user may not be able to access the luggage processing system. For example, if a user from one country travels to another country, it is possible that his/her mobile device may not have cellular data service in that country. Thus, the aforementioned offline mode can provide operability in these circumstances.

Figure 5:
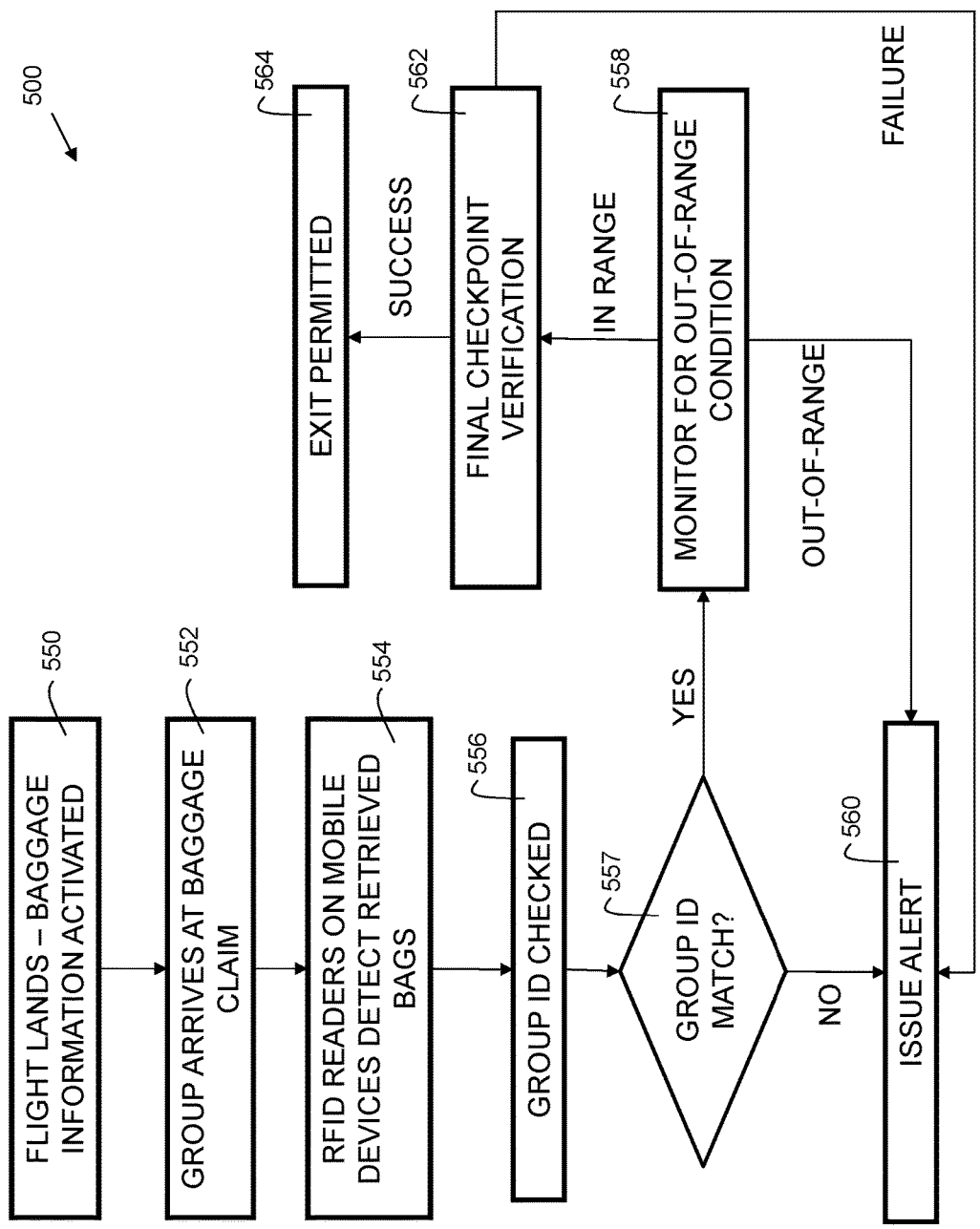
FIG. 5 is a flowchart indicating additional process steps for embodiments of the present invention.

FIG. 5 is a flowchart 500 indicating exemplary steps for implementation of embodiments of the present invention. At 550, baggage information is activated (e.g., upon a flight landing). For example, an RFID scanner at the door of the airport where the baggage from the arriving flight is headed for placement on the baggage claim conveyor, may scan RFID tags as they enter the building. At 552, a group arrives at the baggage claim area of the airport. At 554, RFID readers on user mobile devices detect retrieved items of luggage. At 556, a group ID is checked. At 557, it is determined whether the retrieved luggage items and the group ID associated with the luggage match. If not, an alert is issued at 560. If yes, at 558, monitoring for an out-of-range condition is activated. An out-of-range condition occurs when a user's mobile device can no longer detect an RFID tag of a piece of luggage it had previously detected while the user's mobile device was in motion for more than a predetermined amount of time (see FIG. 12). If it is determined that it is out of range, the process proceeds to 560 where an alert is issued. If instead it is found to be in range, a final checkpoint verification is performed at 562. If there is a failure at 562, then the process proceeds to 560 where an alert is issued. If it is a success at 562, exit of the person with the retrieved luggage is permitted at 564.

In embodiments, a luggage tag (e.g. 600 of FIG. 6) may be equipped with an active RFID tag. The active RFID tag has its own power source and antenna. In embodiments, the active RFID tag may operate at range of 433-915 MHz. In embodiments, the active RFID tag may be recycled. Thus, in embodiments, the user may turn in the RFID tags upon exit of the baggage claim area (e.g. return the RFID tags to the airline) so they can be reused for a future passenger. The active RFID tag may operate in a transponder mode. In this mode, the RFID tag conserves battery life since it only activates when in proximity to a reader (e.g. 118 of FIG. 1).

In embodiments, an out-of-range condition may be determined based on a received signal strength indication (RSSI). In some embodiments, the out-of-range condition may be determined based on a lack of response from an RFID tag to an interrogation. In embodiments, a user's mobile device may periodically interrogate an RFID tag affixed to a piece of luggage. The interrogation may include sending a radio frequency (RE) signal from the user's mobile device to the RFID tag. When the RFID tag receives the interrogation, it provides a response via RE signal. When the user's mobile device and the RFID tag are of a sufficient distance (e.g. 5 meters) apart, then the RFID tag can no longer receive the interrogation, and thus does not send any responses. The mobile device detects the lack of response to an interrogation as an out-of-range condition.

Figure 6:
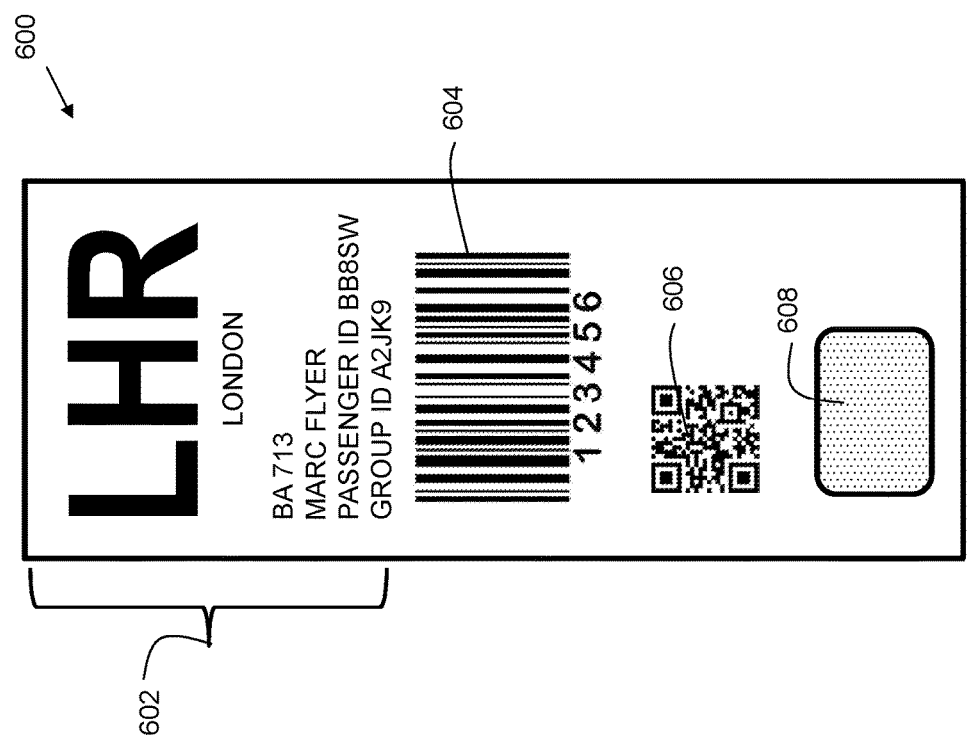
FIG. 6 is an exemplary printed luggage tag in accordance with embodiments of the present invention.

FIG. 6 is an exemplary printed luggage tag 600 in accordance with embodiments of the present invention. On the example tag, written information 602 is included. The written information includes the abbreviation and city of the airport—LHR and London, respectively. Additionally, the written information includes the flight number—BA 713, user name—Marc Flyer, passenger ID—BB8SW, and group ID—A2JK9. In implementations, more or fewer items of information may be included on the tag. The example tag has three codes, including a barcode 604, a quick response (QR) code 606, and a RFID tag 608. The code(s) may include information on a passenger ID, a group ID, and/or other suitable information. In implementations, more or fewer codes may be included on a luggage tag.

Figure 7:
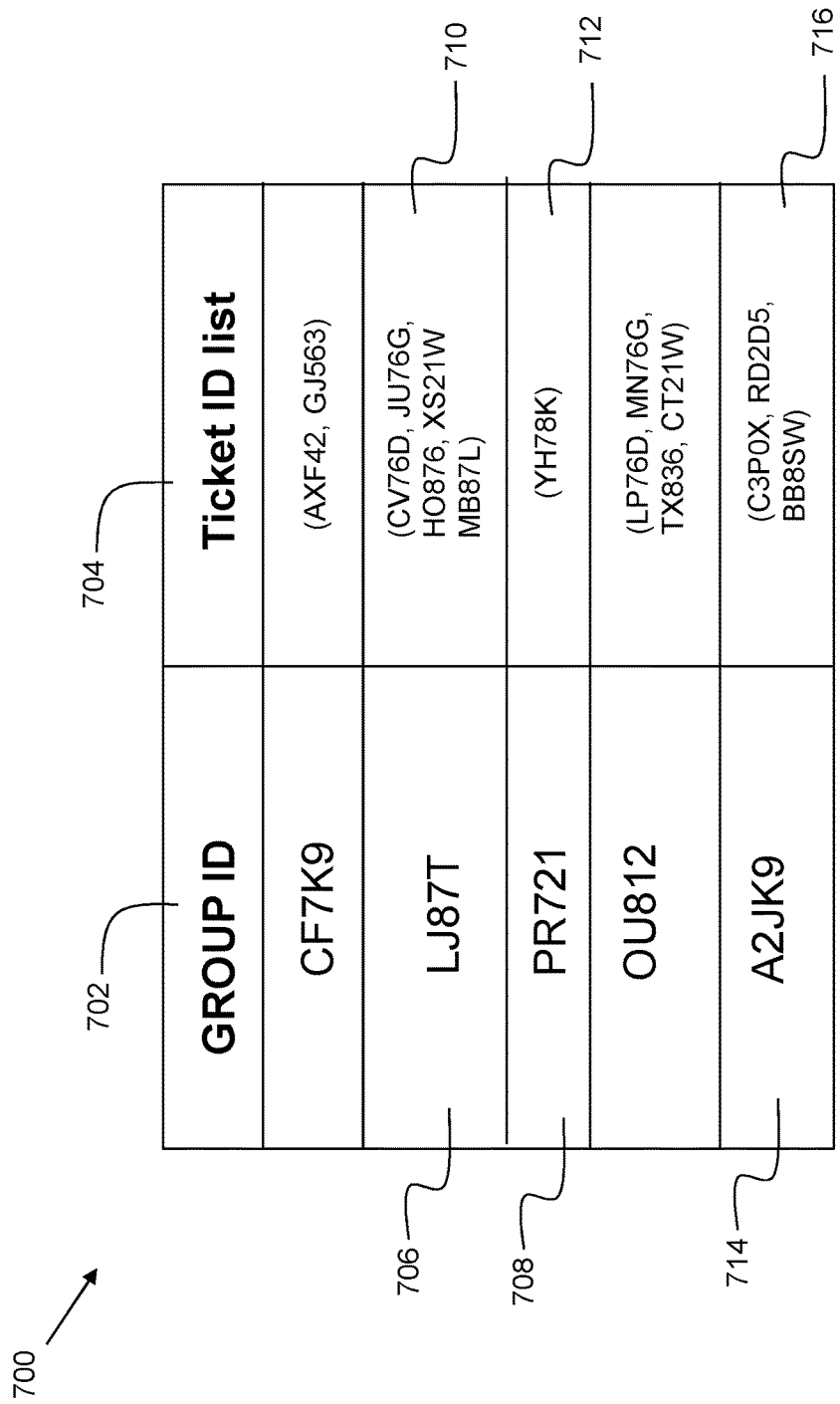
FIG. 7 is an exemplary data structure showing a relationship between groups and individuals.

FIG. 7 is an exemplary data structure 700 showing a relationship between groups and individuals. In embodiments, the data structure 700 serves as a linked index for tracking luggage within a premises on an electronic computing device. As shown, the data structure 700 is a database. It includes two categories (columns)—group ID 702 and ticket ID list 704. As shown, a group ID may include one or more ticket IDs. For example, group ID LJ87T at 706 includes 5 ticket IDs at 710, whereas group ID PR721 at 708 includes a single ticket ID at 712. In the example discussed herein, group 202 (see FIG. 2) is assigned group ID—A2JK9 at 714. The individual identifiers are shown at 716.

Figure 8C:
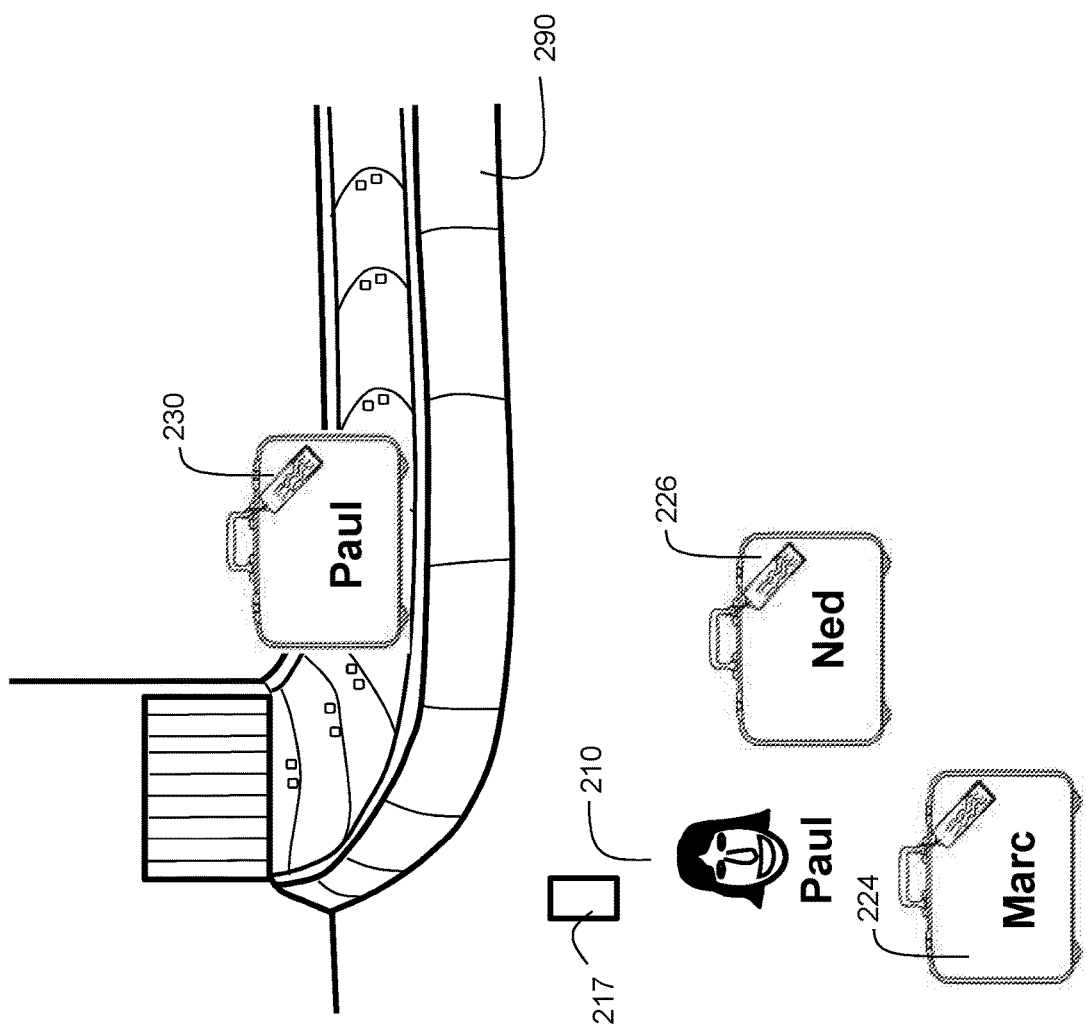

FIGS. 8A-8C show example baggage claim scenarios. FIG. 8A shows an airport baggage claim area according to the example described herein. Passenger luggage is dispensed from an incoming flight to the baggage conveyor 290. Marc 204 is in the baggage claim area looking at the conveyor 290. Marc's luggage 224 and Ned's luggage 226 are currently on the conveyor 290.

FIG. 8B shows Marc 204 having retrieved items of luggage including Marc's luggage 224, Ned's luggage 226, and Oscar's luggage 228. Paul's luggage 230 is still on conveyor 290. Referring to FIG. 2, Marc 204, Ned 206, and Oscar 208 are members of the same group (group ID at 714 in FIG. 7), and therefore, their user IDs are authorized to retrieve any luggage associated with the group. Therefore, Marc 204 receives an indication on his mobile device that he is allowed to leave with the items of luggage 224, 226, and 228.

FIG. 8C shows Paul's luggage 230 on conveyor 290. Paul 210 has retrieved from conveyor 290 Marc's luggage 224 and Ned's luggage 226. Referring to FIG. 2, Paul 210 is not part of the group 202. Accordingly, his user ID is not associated with the group ID 714 of FIG. 7. Therefore, when it is detected that he has retrieved Marc's luggage 224 and Ned's luggage 226, an alert is issued. In embodiments, the alert may not be issued until an association is established by motion for a predetermined time. For example, it may not be desirable to sound an alarm simply because Paul 210 is in close proximity to Marc's luggage 224 and Ned's luggage 226. In a crowded baggage claim area, this could result in many false alarms. Rather, the motion of the mobile device is tracked. If, for example, the mobile device of Paul 210 is moving for 20 seconds (or other predetermined time interval) and Marc's luggage 224 and Ned's luggage 226 are continuously in range (e.g., within five feet of mobile device), then it is inferred that Paul 210 is carrying Marc's luggage 224 and Ned's luggage 226, and an alert is then sent. Thus, in some embodiments, an alert is issued in response to detecting an out-of-range condition on one or more of the luggage pieces. The alert may be sent as a text message to Paul's phone 217. The alert may be sent to the group members' phones of Marc 204, Ned 206, and Oscar 208. The alert may be sent to phones of Marc 204 and Ned 206 since it is their luggage that was wrongfully taken. The alert may be sent to airport security, or to the police, etc.

Figure 9:
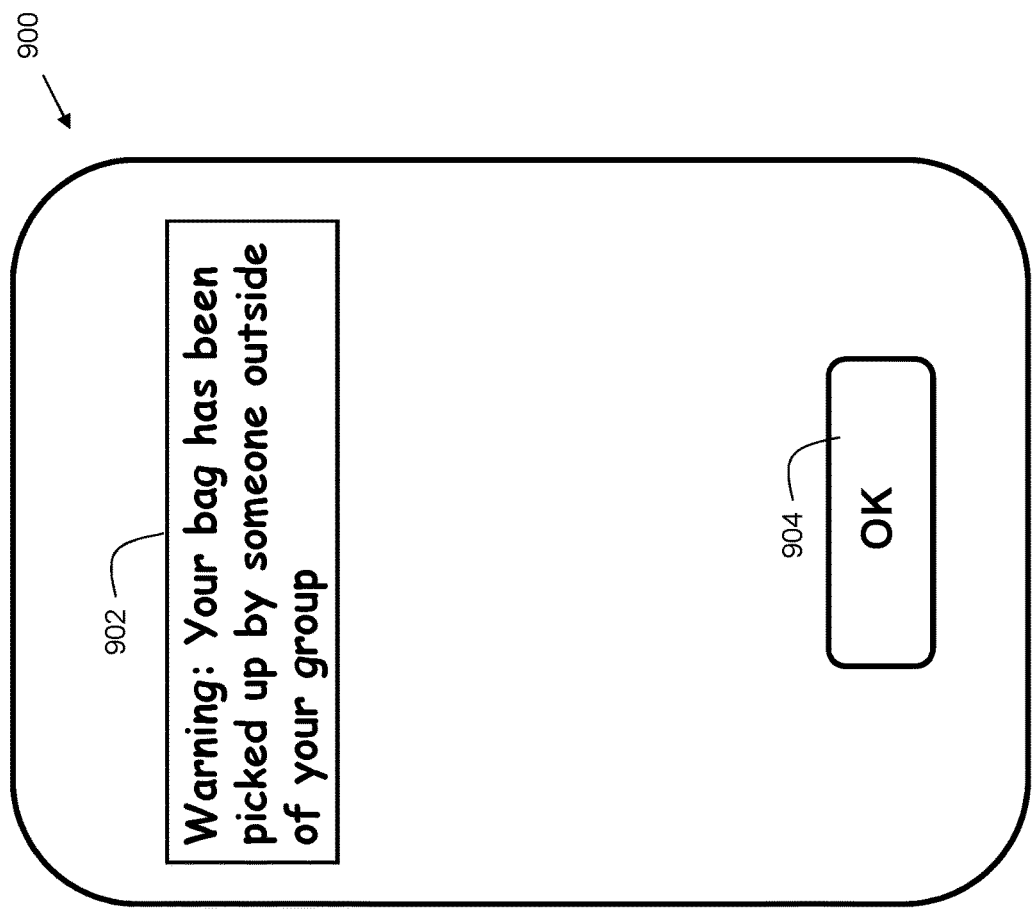
FIG. 9 shows an exemplary baggage warning.

FIG. 9 shows an exemplary baggage alert. User device screen 900 may be a screen of a user's smartphone or other suitable device having a user interface. The alert may be sent to a phone number, email address, or other suitable target. In the example, the alert 902 reads, "Warning: Your bag had been picked up by someone outside of your group." This warning would be opened on Marc's or Ned's phone in the example of FIG. 8C. Option 904 is a button selectable by a user's finger or stylus to acknowledge receipt of the message. In embodiments, the alert language may be different. In addition, the user interface may include more or fewer features where feasible.

Figure 10A:
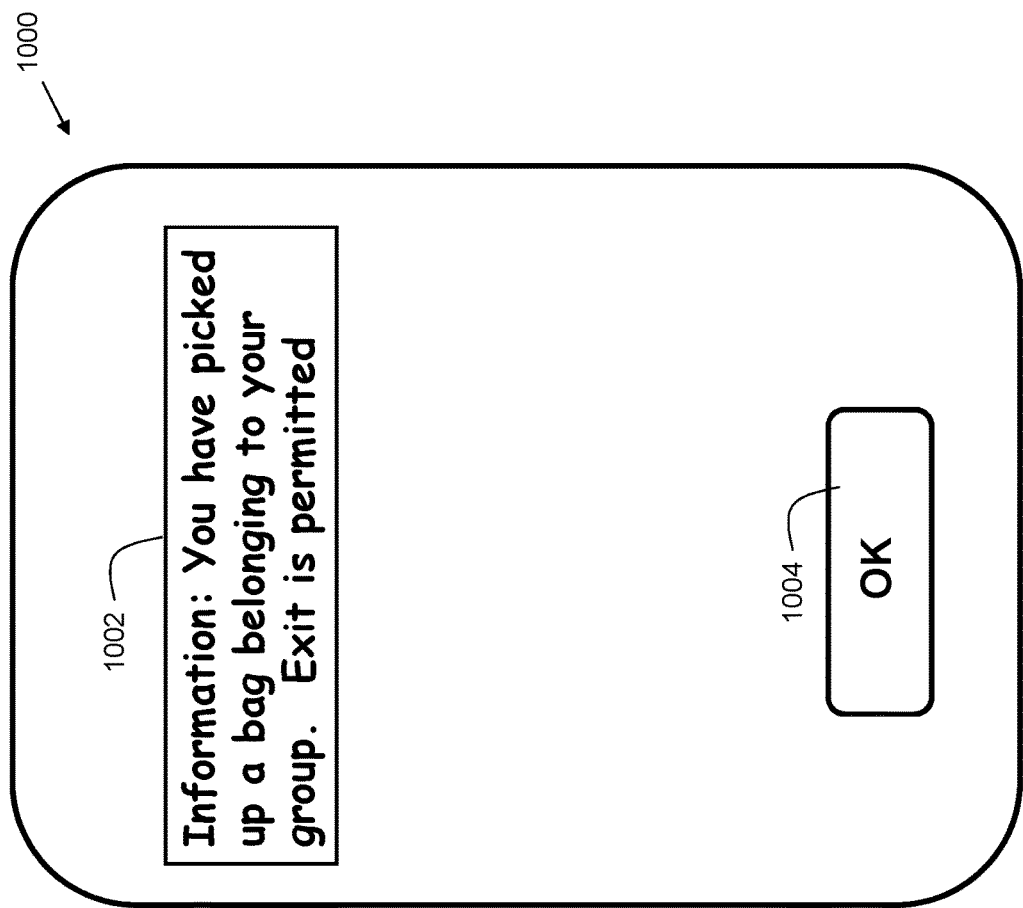
FIG. 10A shows an exemplary informational message indicating exit is permitted.

FIG. 10A shows an exemplary informational message. User device screen 1000 may be a user's smartphone screen having a user interface. The alert may be sent to a phone number, email address, or other suitable target. In the example, the message 1002 reads, "Information: You have picked up a bag belonging to your group. Exit is permitted." This message would be opened on Marc's or Ned's phone in the example of FIG. 8B. Option 1004 is a button selectable by a user's finger or stylus to acknowledge receipt of the message. In embodiments, the alert language may be different. In addition, the user interface may include more or fewer features where suitable. The message serves to indicate that the user can exit the baggage area with the bag. In embodiments, the user may be required to show his/her device with the message 1002 as proof that the user is carrying bags from the group. Thus, in embodiments, the message 1002 rendered on a mobile device can serve as a digital claim check for luggage.

Figure 10B:
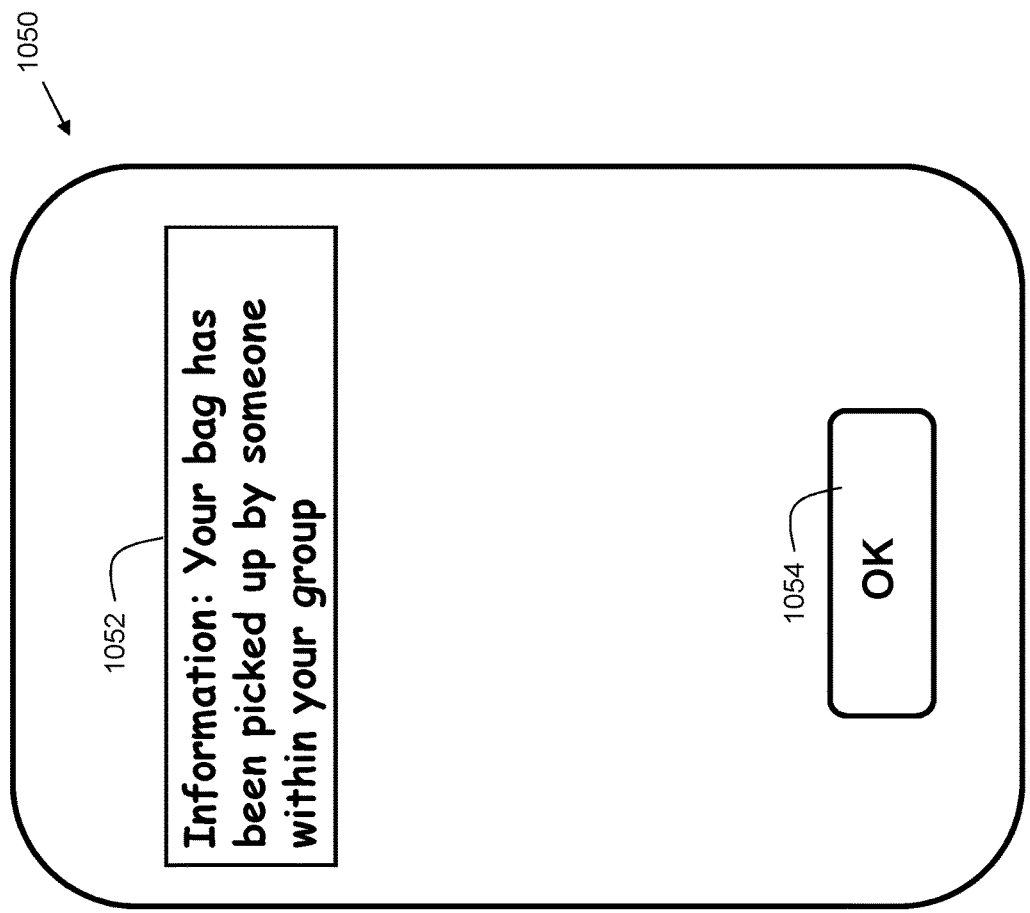
FIG. 10B shows an exemplary baggage confirmation.

FIG. 10B shows an exemplary baggage confirmation. User device screen 1050 may be a user's smartphone screen having a user interface. The alert may be sent to a phone number, email address, or other suitable target. In the example, the alert 1052 reads, "Information: Your bag has been picked up by someone within your group." This message would be opened on Marc's or Ned's phone in the example of FIG. 8B. Option 1054 is a button selectable by a user's finger or stylus to acknowledge receipt of the message. In embodiments, the alert language may be different. In addition, the user interface may include more or fewer features where suitable.

Figure 11:
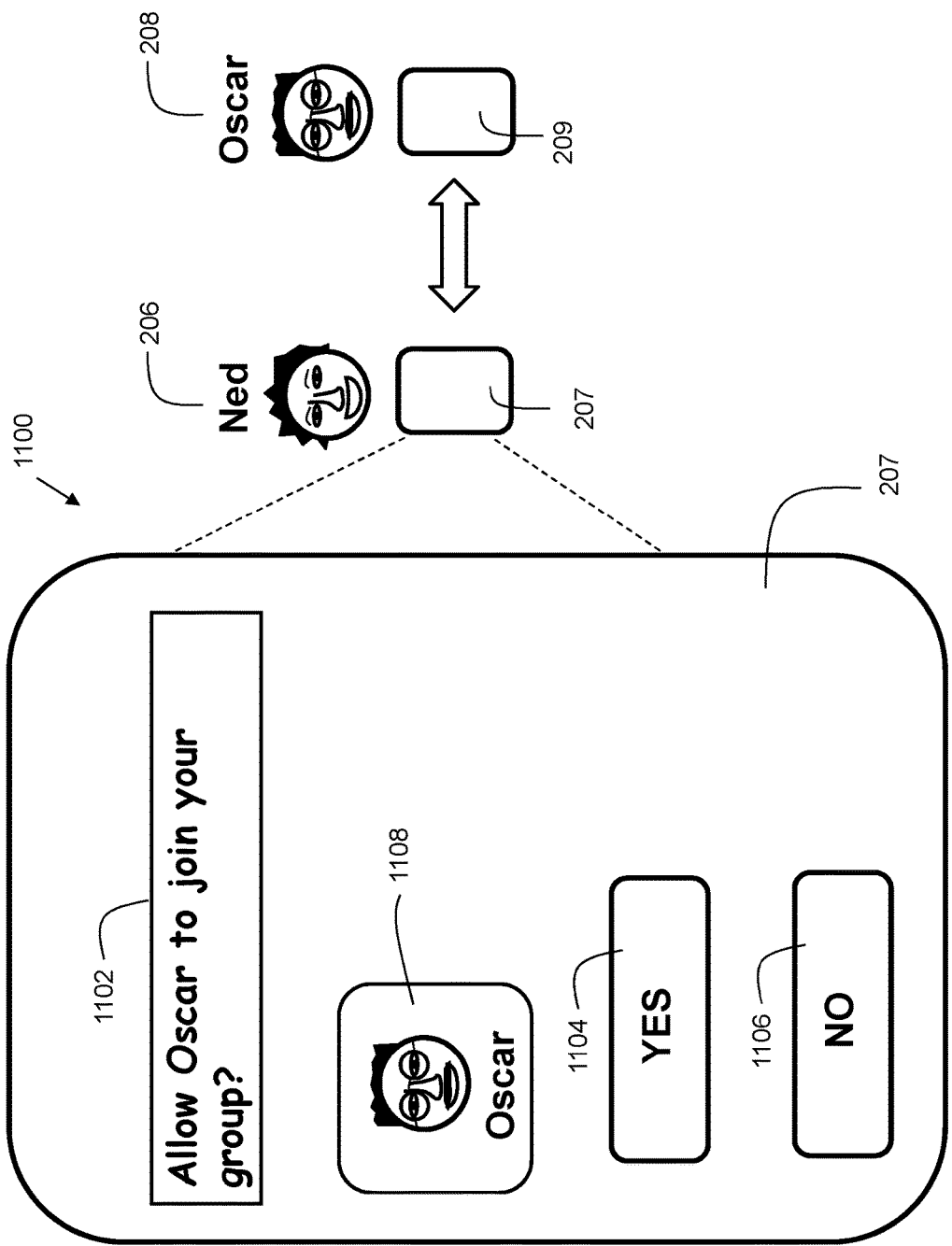
FIG. 11 shows an example of establishing a group identifier is based on a data exchange.

FIG. 11 shows a diagram 1100 of an example of establishing a group identifier based on a data exchange (i.e. a "handshake"). In the example, Ned 206 and Oscar 208 each have a smartphone 207 and 209, respectively. In embodiments, both phones have an application installed on them. The application may broadcast a beacon through a wireless profile such as near field communication, Bluetooth Low Energy, or other suitable communication protocol. The beacon may contain one or more data fields, including a passenger name and a passenger identifier. The passenger name and identifier that is broadcast can be detected by another user's mobile device that is in proximity. The mobile device that receives the beacon can determine the name included in the data of the beacon. In some embodiments, the application then may search the contact database on the mobile phone. If a contact record is found, an image (if available) of the person may be retrieved from the contact record and displayed on the mobile device.

In the example, Oscar 208 with his smartphone 209 is in proximity (e.g. one meter) to Ned 206 and his smartphone 207. Accordingly, when Ned 206 opens the app. on the display of his phone 207, a user interface is displayed including a message 1102 reading, "Allow Oscar to join your group?" A photo 1108 of Oscar appears on the user interface, as well as buttons from which Ned 206 may choose. When the user acknowledges that a group is to be formed, the mobile device may then send a message to the luggage processing system (302 of FIG. 3) where the message contains a list of names, which includes the name found in the received beacon, as well as the name of the user of the mobile device that received the beacon. The luggage processing system then creates a group identifier based on those two names.

In some cases, a first person may already be a member of a group while a second person is not. In such a case, as a result of the handshake, the second person who was not a member of a group becomes a member of the group that the first person belongs to. In the example, button 1104 confirms that Oscar may join the group, and button 1106 cancels the operation, not allowing Oscar to join the group. When Ned 206 selects button 1104, Oscar 208 is joined to the group. In embodiments, the user interface language may be different. In addition, the user interface may include more or fewer features where suitable.

Figure 12:
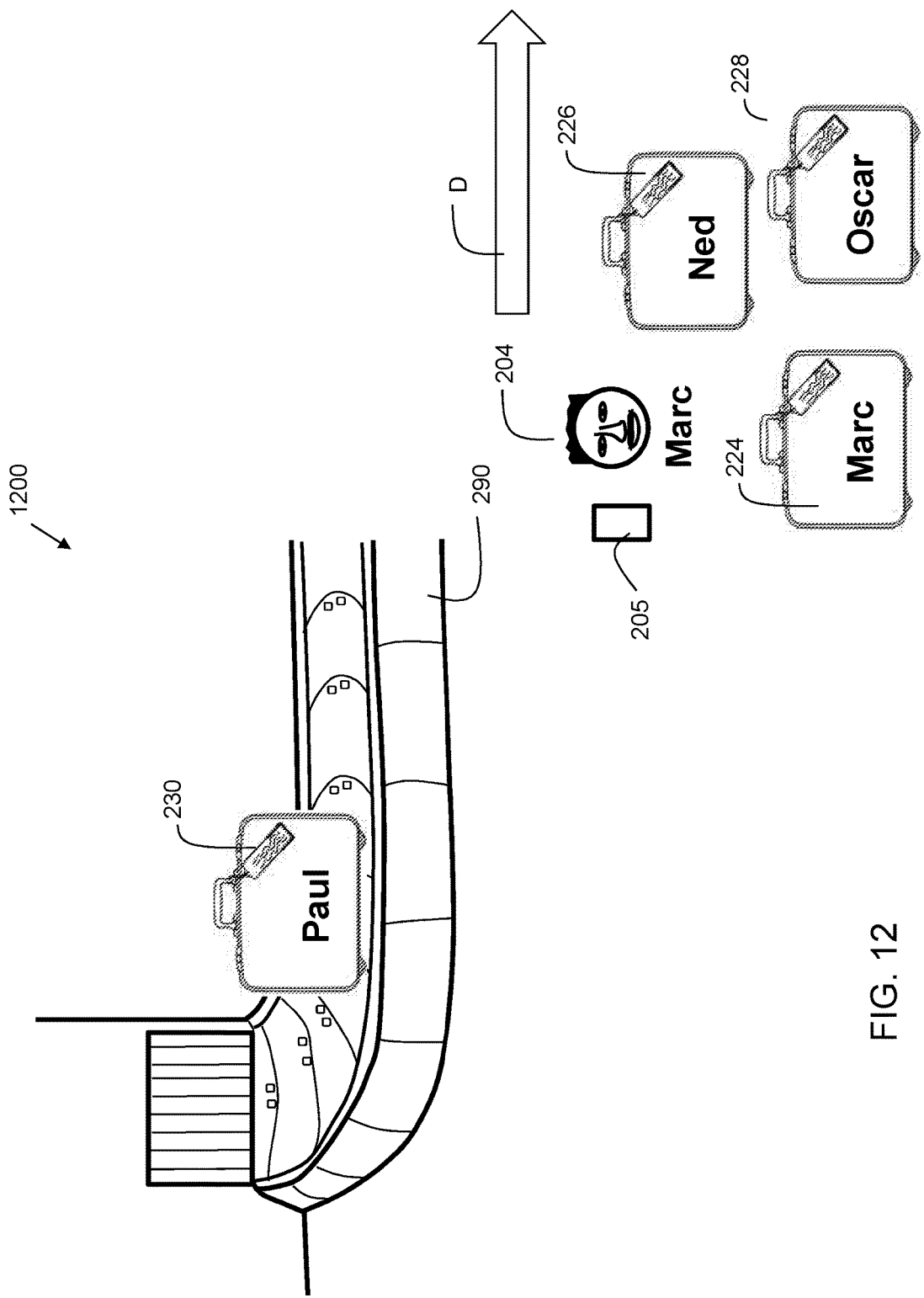
FIG. 12 shows a diagram of an example of establishing an association between a person and one or more luggage pieces in proximity to the person.

FIG. 12 shows a diagram 1200 of an example of establishing an association between a person and one or more luggage pieces in proximity to the person. The association may be based on a combination of NFC detection and motion. For example, when a mobile device of a user is detected to be in motion (e.g., using a geolocation receiver, Wifi triangulation, etc.) for a predetermined threshold period of time and the same luggage pieces are continuously in contact with the mobile device via NFC (e.g., within range of one meter), then those luggage pieces are inferred to be being "transported" by the user of the mobile device. In the example, Marc 204 is walking in direction "D" with user device 205 in his pocket. He's pushing with him luggage 224, 226, and 228. In the example, the predetermined threshold is 30 seconds. Mobile device 205 has detected the motion of Marc 204 and communication from the RFID tags on luggage 224, 226, and 228 for at least 30 seconds. Accordingly, the luggage is associated with Marc 204.

As can now be appreciated, disclosed embodiments provide for improved convenience and security during travel by establishing a group identifier for people traveling together. For each traveler within the group, their luggage is associated with the group. With this association in place, any member of the group can take custody of the luggage from the baggage claim area, thereby greatly streamlining the luggage reclamation process, reducing the time required to obtain the luggage, and reducing crowds in the baggage claim area.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semi-conductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for tracking luggage within a premises, comprising:
    establishing, based on a data exchange between a first mobile device of a first person and a second mobile device of a second person, a group identifier pertaining to a group comprising a plurality of people;
    associating a plurality of luggage pieces with the group identifier;
    determining a group identifier of a person that is removing one of the plurality of luggage pieces from a luggage area; and
    providing an indication of permission on a mobile device associated with the first person to exit the luggage area while carrying one or more of the plurality of luggage pieces that are associated with the group identifier.

2. The method of claim 1, further comprising issuing an alert message if the person that is removing one of the plurality of luggage pieces from the luggage area is not a member of the group.

3. The method of claim 1, wherein establishing the group identifier is based on a ticket purchase transaction.

4. The method of claim 1, further comprising applying a barcode to each of the plurality of luggage pieces, wherein the barcode is encoded with the group identifier.

5. The method of claim 1, further comprising applying an RFID tag to each of the plurality of luggage pieces, wherein the RFID tag is encoded with the group identifier.

6. The method of claim 1, further comprising establishing an association between a person from the group and one or more luggage pieces in proximity to the person.

7. The method of claim 6, further comprising issuing an alert in response to detecting an out-of-range condition on one or more of the luggage pieces.

8. An electronic device comprising:
    a processor;
    a memory coupled to the processor, the memory containing instructions, that when executed by the processor, perform the steps of:
    establishing, based on a data exchange between a first mobile device of a first person and a second mobile device of a second person, a group identifier pertaining to a group comprising a plurality of people;
    associating a plurality of luggage pieces with the group identifier;
    determining a group identifier of a person that is removing one of the plurality of luggage pieces from a luggage area; and
    providing an indication of permission on a mobile device associated with the first person to exit the luggage area while carrying one or more of the plurality of luggage pieces that are associated with the group identifier.

9. The electronic device of claim 8, wherein the memory further contains instructions, that when executed by the processor, perform the step of issuing an alert message if the person that is removing one of the plurality of luggage pieces from the luggage area is not a member of the group.

10. The electronic device of claim 8, further comprising an RFID reader, and wherein the memory further contains instructions, that when executed by the processor, perform the step of reading a group identifier encoded on an RFID tag attached to at least one of the plurality of luggage pieces.

11. The electronic device of claim 10, wherein the memory further contains instructions, that when executed by the processor, perform the step of issuing an alert in response to detecting an out-of-range condition on one or more of the luggage pieces.

12. The electronic device of claim 10, wherein the memory further contains instructions, that when executed by the processor, perform the step of establishing an association between a person from the group and one or more luggage pieces in proximity to the person.

13. A computer program product for creating a linked index for tracking luggage within a premises on an electronic computing device, the electronic computing device comprising a computer readable storage medium having program instructions embodied therewith, the program instructions executable by a processor to cause the electronic computing device to:
    establish, based on a data exchange between a first mobile device of a first person and a second mobile device of a second person, a group identifier pertaining to a group comprising a plurality of people;
    associate a plurality of luggage pieces with the group identifier;
    determine a group identifier of a person that is removing one of the plurality of luggage pieces from a luggage area; and
    provide an indication of permission on a mobile device associated with the first person from the group to exit the luggage area while carrying one or more of the plurality of luggage pieces that are associated with the group identifier.

14. The computer program product of claim 13, further comprising program instructions executable by the processor to cause the electronic computing device to issue an alert message if the person that is removing one of the plurality of luggage pieces from the luggage area is not a member of the group.

15. The computer program product of claim 13, further comprising program instructions executable by the processor to cause the electronic computing device to read a group identifier encoded on an RFID tag attached to at least one of the plurality of luggage pieces.

16. The computer program product of claim 15, further comprising program instructions executable by the processor to cause the electronic computing device to issue an alert in response to detecting an out-of-range condition on one or more of the luggage pieces.

17. The computer program product of claim 15, further comprising program instructions executable by the processor to cause the electronic computing device to establish an association between the first person from the group and one or more luggage pieces in proximity to the first person.

18. The computer program product of claim 17, further comprising program instructions executable by the processor to cause the electronic computing device to send a message to one or more mobile electronic devices associated with the group identifier in response to establishing the association between the first person from the group and the one or more luggage pieces in proximity to the first person.

* * * * *